US012618458B2

(12) United States Patent
Karmarkar et al.

(10) Patent No.: US 12,618,458 B2
(45) Date of Patent: May 5, 2026

(54) LIMITED SLIP DIFFERENTIAL UNIT

(71) Applicant: DANA ITALIA S.R.L., Arco (IT)

(72) Inventors: Sudatta Karmarkar, Pune (IN); Idris Poonawala, Pune (IN); Pradip Jasud, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 19/000,984

(22) Filed: Dec. 24, 2024

(65) Prior Publication Data

US 2025/0224024 A1 Jul. 10, 2025

Related U.S. Application Data

(60) Provisional application No. 63/618,065, filed on Jan. 5, 2024.

(51) Int. Cl.
| | |
|---|---|
| *F16H 48/40* | (2012.01) |
| *B60K 1/00* | (2006.01) |
| *F16H 48/08* | (2006.01) |
| *F16H 48/22* | (2006.01) |
| *F16H 48/28* | (2012.01) |

(52) U.S. Cl.
CPC ............. *F16H 48/40* (2013.01); *F16H 48/08* (2013.01); *F16H 48/22* (2013.01); *B60K 2001/001* (2013.01); *F16H 2048/282* (2013.01)

(58) Field of Classification Search
CPC ........ F16H 48/08–2048/087; F16H 2048/282; F16H 37/08–0826; B60K 2001/001
See application file for complete search history.

(56) References Cited

U.S. PATENT DOCUMENTS

| | | | | |
|---|---|---|---|---|
| 2,043,006 A | * | 6/1936 | Morgan .................. | F16H 48/08 |
| | | | | 475/229 |
| 6,168,545 B1 | | 1/2001 | Lowell | |
| 6,436,002 B1 | * | 8/2002 | Ishikawa .............. | F16H 48/295 |
| | | | | 475/231 |
| 6,524,211 B2 | * | 2/2003 | Okazaki .................. | F16H 48/22 |
| | | | | 475/241 |

(Continued)

FOREIGN PATENT DOCUMENTS

| | | | | |
|---|---|---|---|---|
| DE | 2447599 A1 | * | 4/1975 | .............. F16H 1/44 |
| DE | 102011103249 A1 | * | 12/2012 | ............. F16H 48/22 |

(Continued)

*Primary Examiner* — James J Taylor, II
(74) *Attorney, Agent, or Firm* — McCoy Russell LLP

(57) ABSTRACT

Systems are provided for a limited slip differential (LSD). The LSD comprises a two-piece differential case, an intermediate floating piece positioned in an interior of the two-piece differential case and configured to slide axially therein. The LSD, further comprises a first side gear and a second side gear meshed with gears of the intermediate floating piece, a first disc spring mounted on the first side gear and a second disc spring mounted on the second side gear, a first clutch pack mounted on the first side gear and positioned between the first disc spring and a lip of the first side gear, and a second clutch pack mounted on the second side gear and positioned between the second disc spring and a lip of the second side gear, and a shim mounted on the second side gear and positioned axially between the second disc spring and the two-piece differential case.

17 Claims, 10 Drawing Sheets

(56)                    References Cited

U.S. PATENT DOCUMENTS

| 7,354,374 | B2 * | 4/2008 | Teraoka | F16H 48/34 |
| | | | | 475/231 |
| 7,452,299 | B2 * | 11/2008 | Teraoka | F16H 48/34 |
| | | | | 192/84.92 |
| 8,452,504 | B2 * | 5/2013 | Dickinson | F16H 48/32 |
| | | | | 180/65.28 |
| 11,155,161 | B2 * | 10/2021 | Makino | B60K 17/145 |

FOREIGN PATENT DOCUMENTS

| EP | 2604890 | A1 * | 6/2013 | | F16H 55/20 |
| FR | 2944082 | A1 * | 10/2010 | | F16H 48/22 |
| GB | 2327723 | A | 2/1999 | | |

* cited by examiner

LIMITED SLIP DIFFERENTIAL UNIT

CROSS REFERENCE TO RELATED APPLICATION

The present application claims priority to U.S. Provisional Application No. 63/618,065, entitled "LIMITED SLIP DIFFERENTIAL UNIT", and filed on Jan. 5, 2024. The entire contents of the above-listed application are hereby incorporated by reference for all purposes.

TECHNICAL FIELD

A limited slip differential configured to enable torque distribution among drive wheels experiencing different amounts of tractive resistance and prevent drive wheel roll when parked on a grade.

BACKGROUND AND SUMMARY

Axle assemblies are adapted to transmit rotational power from a rotational power source of a vehicle to the wheels thereof. Typically, an axle assembly includes a differential assembly that is rotatably supported within a non-rotating housing (e.g., carrier). The differential is connected between an input drive shaft extending from the rotational power source/transmission and a pair of output axle shafts extending to the vehicle wheels. The axle shafts are contained in respective non-rotating beam housing portions, which are secured to a central housing. Thus, rotation of the differential by the drive shaft causes corresponding rotation of the axle shafts. The central housing and the beam housing portions form an axle housing for these drive train components of the axle assembly, with the differential and the axle shafts supported for rotation therein.

A limited slip differential (LSD) is a type of differential configured to increase traction of one or more drive wheels of an axle that is rotatably driven by the LSD. The LSD detects differences in tractive resistance experienced by different drive wheels and adjusts a distribution of torque from a power source to the drive wheels, such that more torque is delivered to a drive wheel experiencing greater tractive resistance (e.g., the drive wheel with more grip). Existing LSDs may not include sufficient space for differential gears due to a clutch pack of the LSD being preloaded to achieve a desired performance of the LSD. Disc springs used to preload the clutch pack are selected based on preload calculations. In particular, a spring size of the disc springs is selected based on spatial constraints and an ability of the disc springs to achieve a desired preload. Further, in a conventional LSD, a cavity in which the clutch pack is positioned is directly machined in a differential housing. Since a spatial constraint of the cavity is based on an outer diameter of the differential, machining the cavity based on a size of the clutch pack may demand spherical machining of satellite gears of the LSD. Additionally, a footprint and a weight of a conventional LSD may exceed space and weight availability of a vehicle that frequently operates on low-traction driving surfaces, such as a golf cart driving on grass or turf.

The inventors herein have recognized these and other issues with such systems and herein present a LSD that at least partially addresses these challenges. In one embodiment, a LSD comprises a two-piece differential case, an intermediate floating piece positioned in an interior of and coupled to the two-piece differential case via splines that enable the intermediate floating piece to slide axially, the intermediate floating piece including a sleeve assembly with planet gears and a pin positioned therein, a first side gear and a second side gear meshed with each of the planet gears, a first disc spring mounted on the first side gear and a second disc spring mounted on the second side gear, a first clutch pack mounted on the first side gear and positioned between the first disc spring and a lip of the first side gear, and a second clutch pack mounted on the second side gear and positioned between the second disc spring and a lip of the second side gear, and a shim mounted on the second side gear and positioned axially between the second disc spring and the two-piece differential case. The LSD described herein may be integrated in a driveline comprising a drive gear box housing, a power source having a power source output shaft, a first reduction comprising an input pinion mounted on the power source output shaft and a first intermediate gear mounted on an intermediate shaft and meshed with the input pinion, and a second reduction comprising a second intermediate gear mounted on the intermediate shaft and an output gear meshed with the second intermediate gear, where the first reduction and the second reduction transfer power from the power source to the LSD to be distributed to drive wheels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
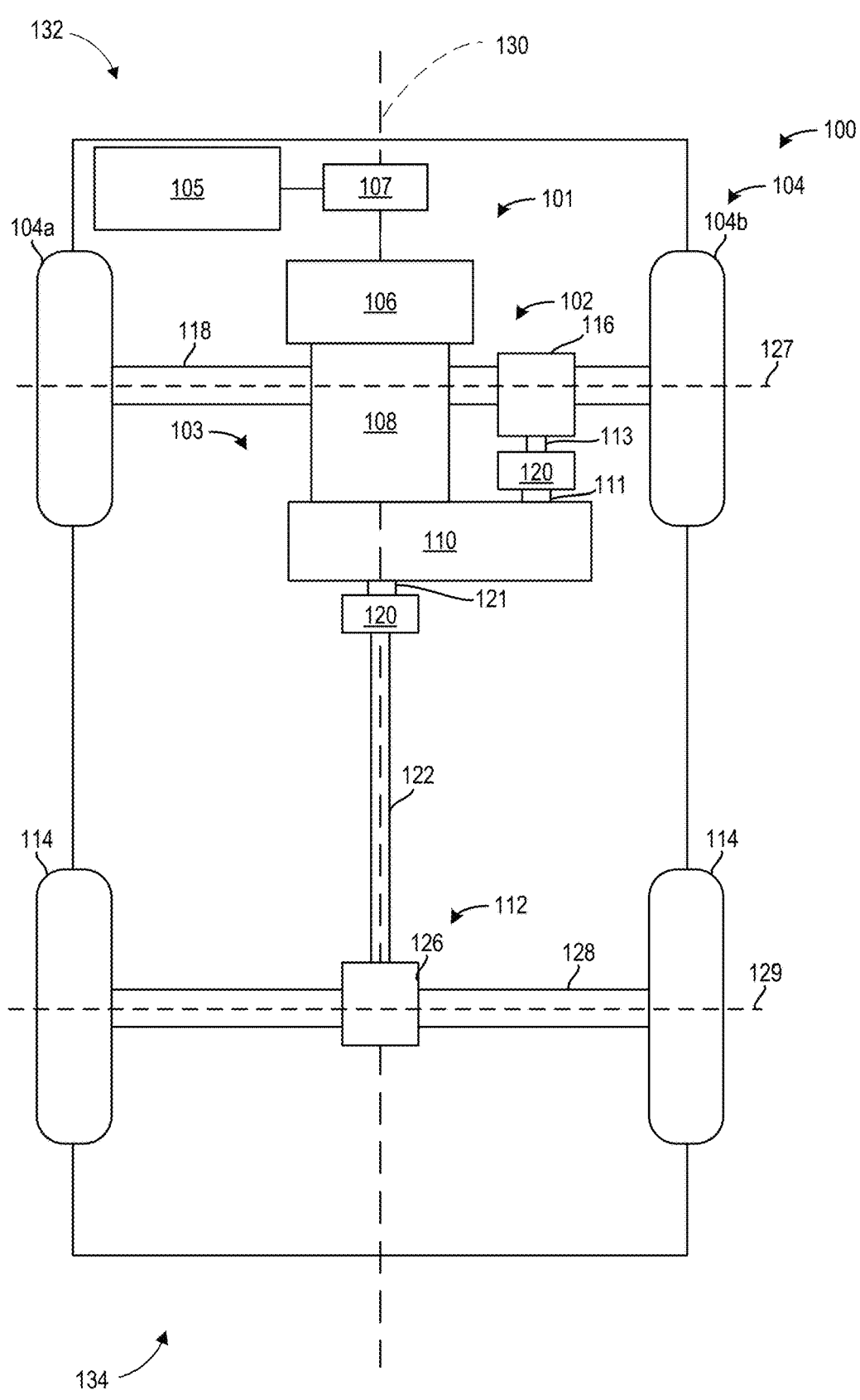
FIG. 1 shows an example schematic of a drivetrain and a power train of a vehicle, including a limited slip differential.

The following description relates to a limited slip differential. A differential is configured to distribute torque between wheels of a respective axle shaft, allowing wheels to rotate at different speeds, particularly when the vehicle is turning. A limited slip differential (LSD) is a type of differential that enables control over torque distribution among wheels to a greater extent than a standard differential. For example, a LSD may be especially useful in scenarios where one or more of the wheels are in contact with a low-traction driving surface (e.g., turf or grass), and/or one or more of the wheels are not in contact with a driving surface (e.g., in the air).

When configured as a LSD, the differential may include a friction mechanism and a preload adjustment mechanism in addition to conventional elements of a differential (e.g., differential case, pinion gear, ring gear, spider gears and side gears). Power is transferred from a power source to the differential case via the ring gear, and transferred to side gears through a differential pin and planet gears. The friction mechanism may be a clutch pack positioned between a side gear and the differential case, and may create resistance that limits a relative motion between the side gear and the differential case. The preload adjustment mechanism may be a spring, for example, and may 'preload' the friction mechanism by applying a force thereto. Preload may be overcome by torque in order to start relative motion between the side gears and the differential case.

When a vehicle is traveling straight (e.g., not turning) and both wheels have moderate to high traction, the LSD operates similarly to a standard differential, and both wheels may rotate freely. During a turn, and/or if one of the wheels begins to lose traction and rotate faster than the other wheel, the friction mechanism in the LSD may engage. Friction of the clutch pack on the side of the fast-rotating wheel may resist the speed difference between the wheels and transfer more torque to the wheel with more traction. For example, the force applied by the preload adjustment mechanism may not be overcome by the fast-rotating wheel. Force applied by the wheel having traction may at least partially overcome friction of the clutch pack on the side of the wheel that has traction, thus more torque may be driven to the wheel with traction, relative to the fast-rotating wheel. The preload may determine how much torque is transferred. For example, a higher preload (e.g., more force on the friction mechanism to be overcome by traction of the wheel) may result in higher torque transfer. Described another way, a lower preload may be more easily overcome by traction of the wheel (e.g., when the wheel is in contact with a low or moderate traction driving surface), compared to a higher preload.

It is desirable to integrate one or more LSDs in vehicles that frequently travel on low-friction driving surfaces (e.g., turf, grass), such as golf carts. However, a footprint and a weight of a conventional LSD may exceed space and weight availability of the vehicle. Thus, a differential is desired that provides a constant preload on axle shaft rotation when a parking brake is applied, such that rotation of one or more wheels that are parked on a grade and/or a low-traction driving surface is restricted. Additionally, it is desirable that the differential has a footprint and a weight that enable integration into the vehicle while still accommodating a clutch pack that enables selective control of torque distribution to drive wheels.

Described herein is a LSD configured with a compact design that enables adjustment of preload applied to one or more clutch packs and enables distribution of torque among axle shafts, using an intermediate floating piece, in response to tractive resistance experienced by drive wheels of the axle shafts. Additionally, preload applied by disc springs to respective clutch packs of the LSD as described herein may further prevent sliding, slipping, or rolling of drive wheels coupled to the LSD when a parking brake is engaged and the drive wheels are parked on a grade having different surface tractions. In this way, when drive wheels come under tractive resistance, a side gear mounted on the axle shaft of the drive wheel is loaded (e.g., has force applied thereto in a direction opposite the preload force from the disc spring). The loaded side gear exerts axial force in an outward direction, which activates a respective clutch pack, depending on a magnitude of force on each side gear. The floating arrangement of the intermediate piece enables preload on the clutch pack to be adjusted via the shim positioned between a side gear and the two-piece differential housing.

Figure 2:
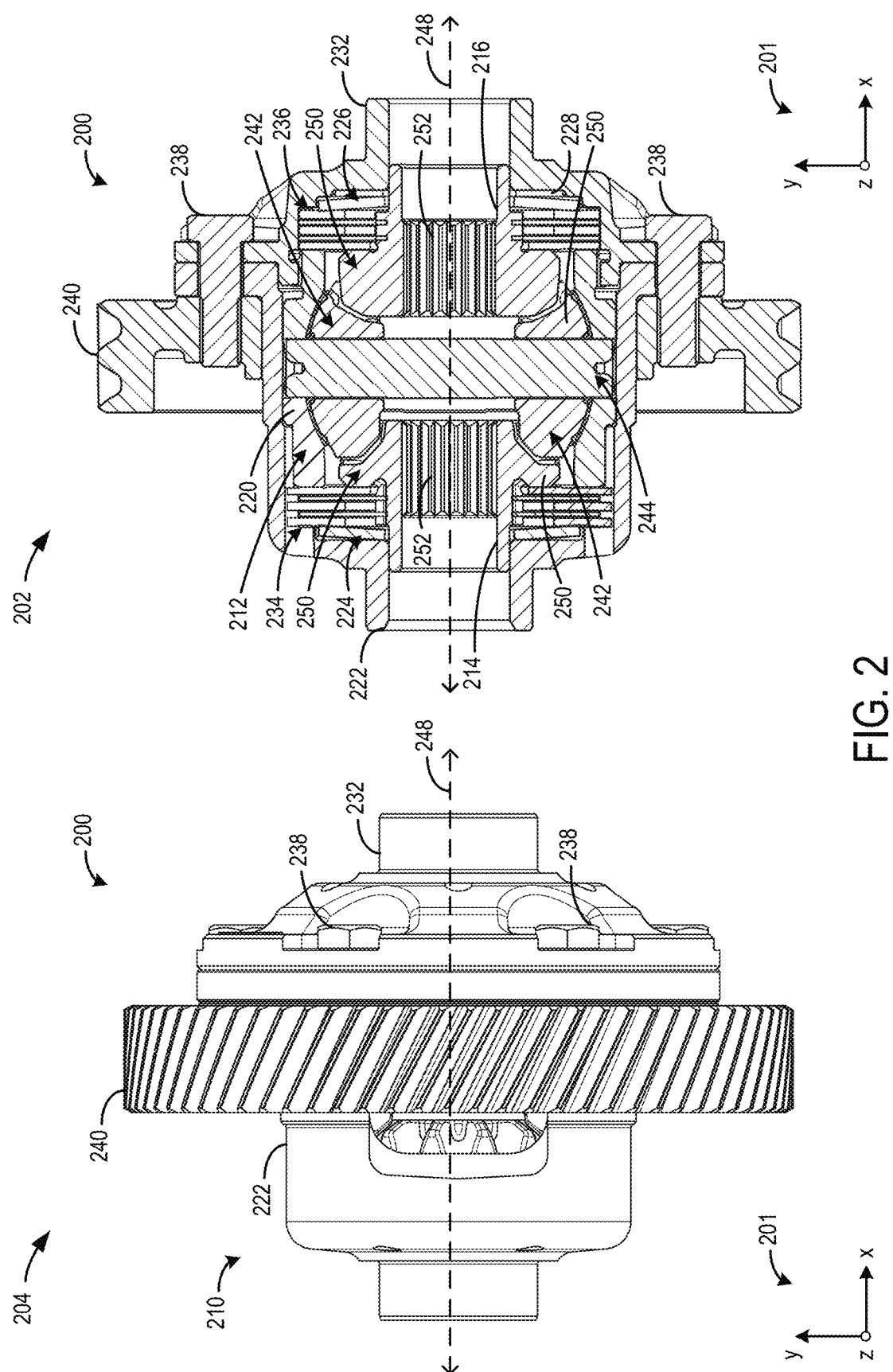
FIG. 2 shows a side view and a cross-sectioned side view of a limited slip differential, such as may be included in the vehicle of FIG. 1.
Figure 3:
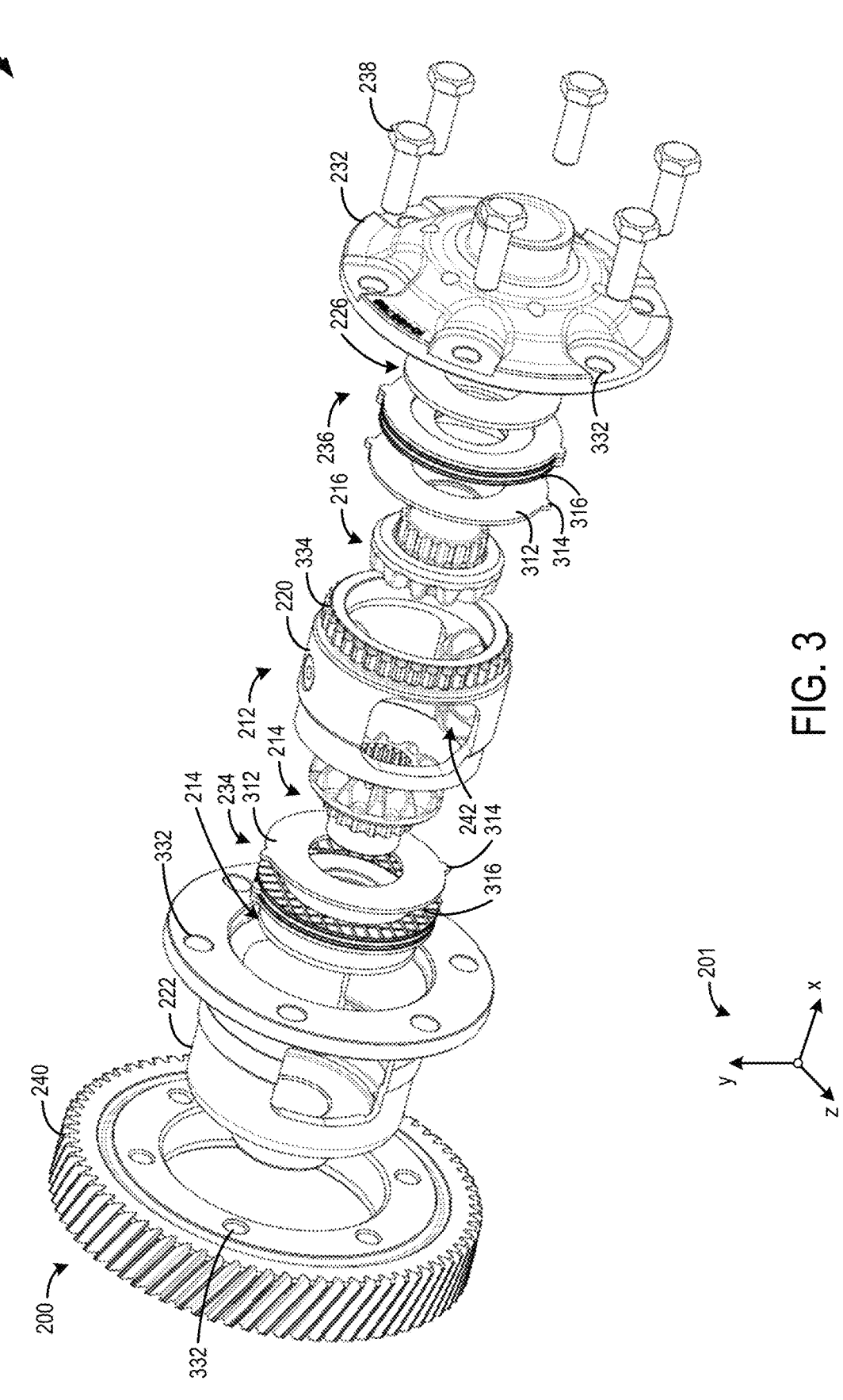
FIG. 3 shows an exploded view of the limited slip differential of FIG. 2.
Figure 4:
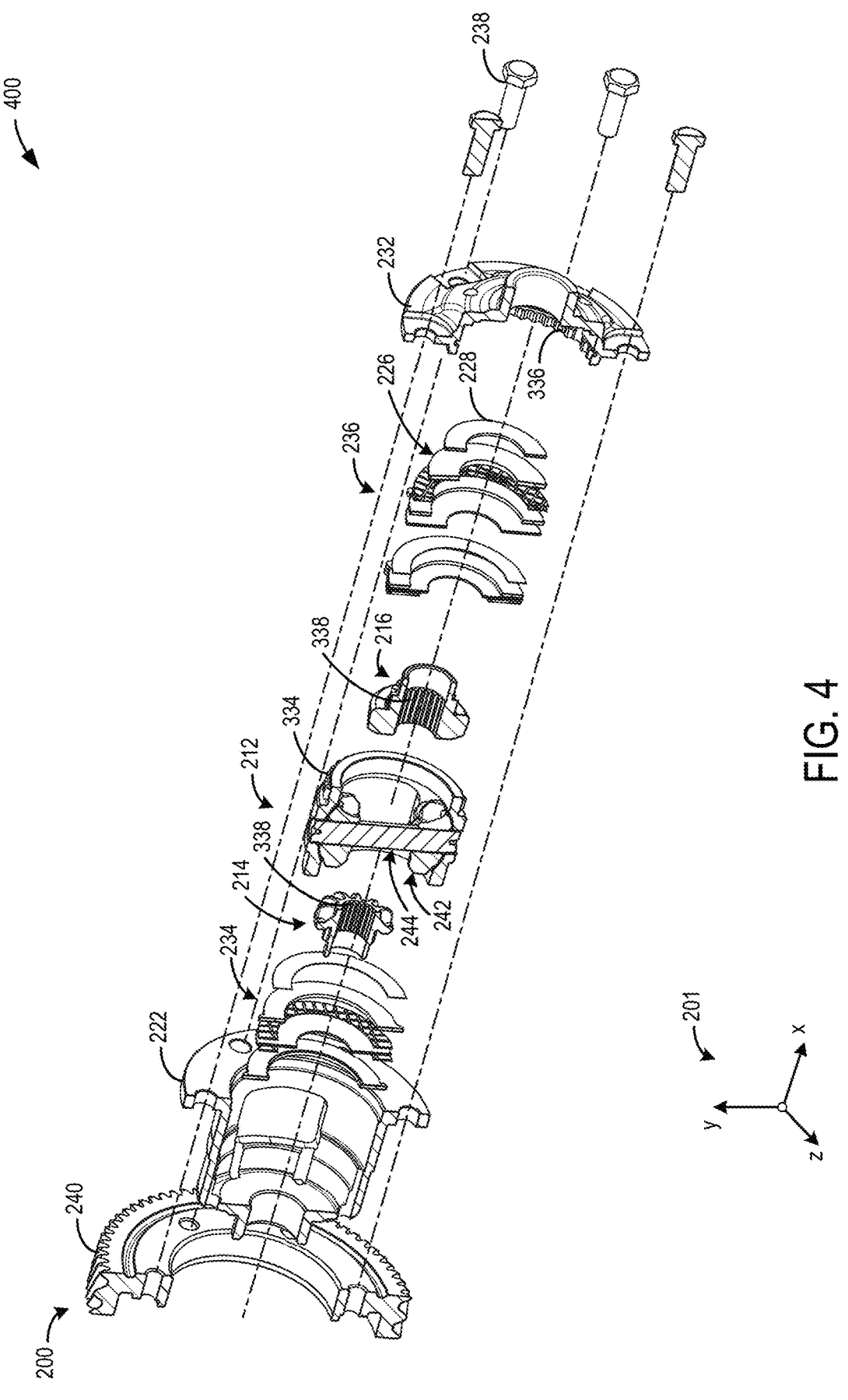
FIG. 4 shows a first perspective cross-sectioned exploded view of the limited slip differential.
Figure 5:
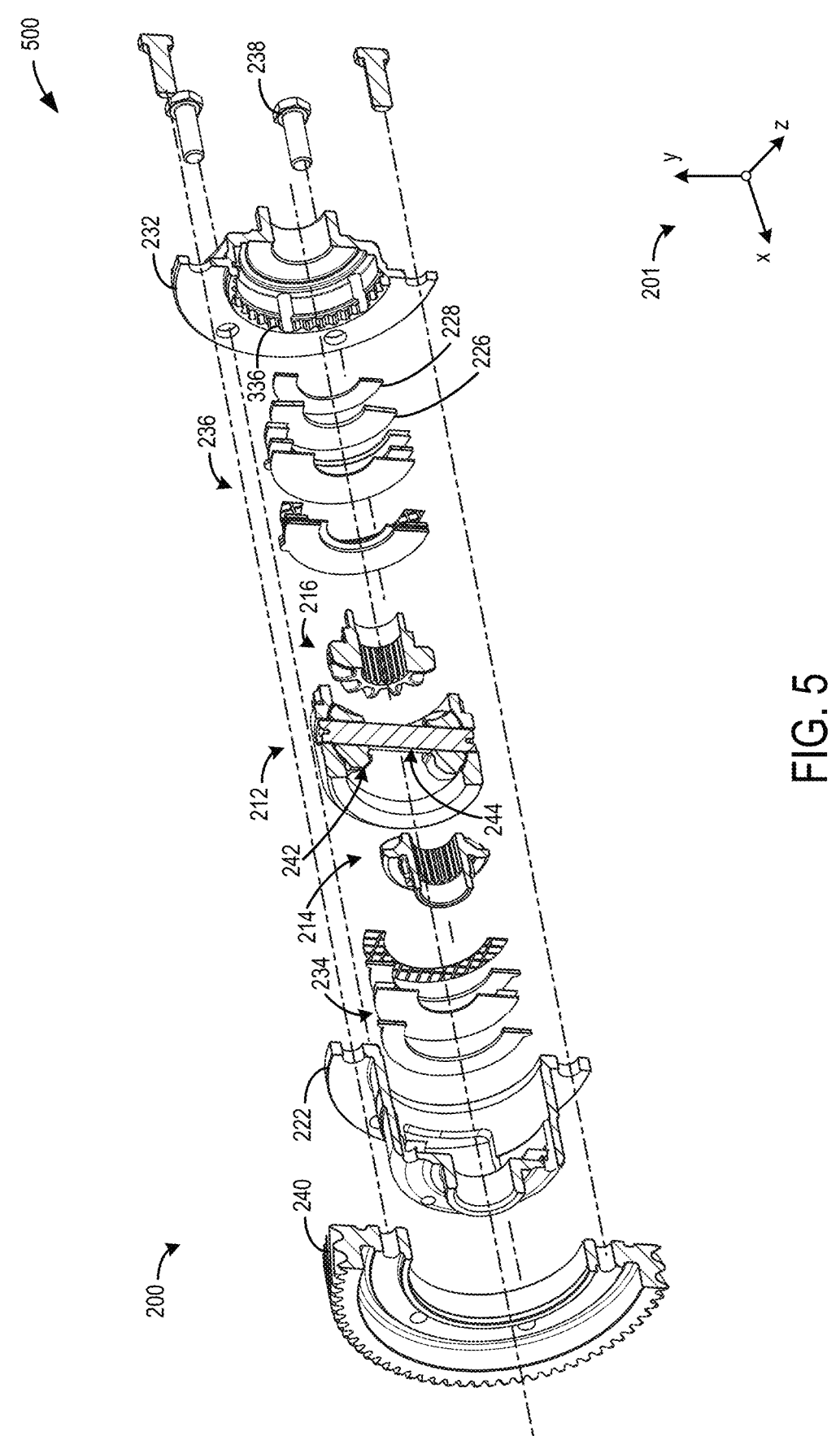
FIG. 5 shows a second perspective cross-sectioned exploded view of the limited slip differential.
Figure 6:
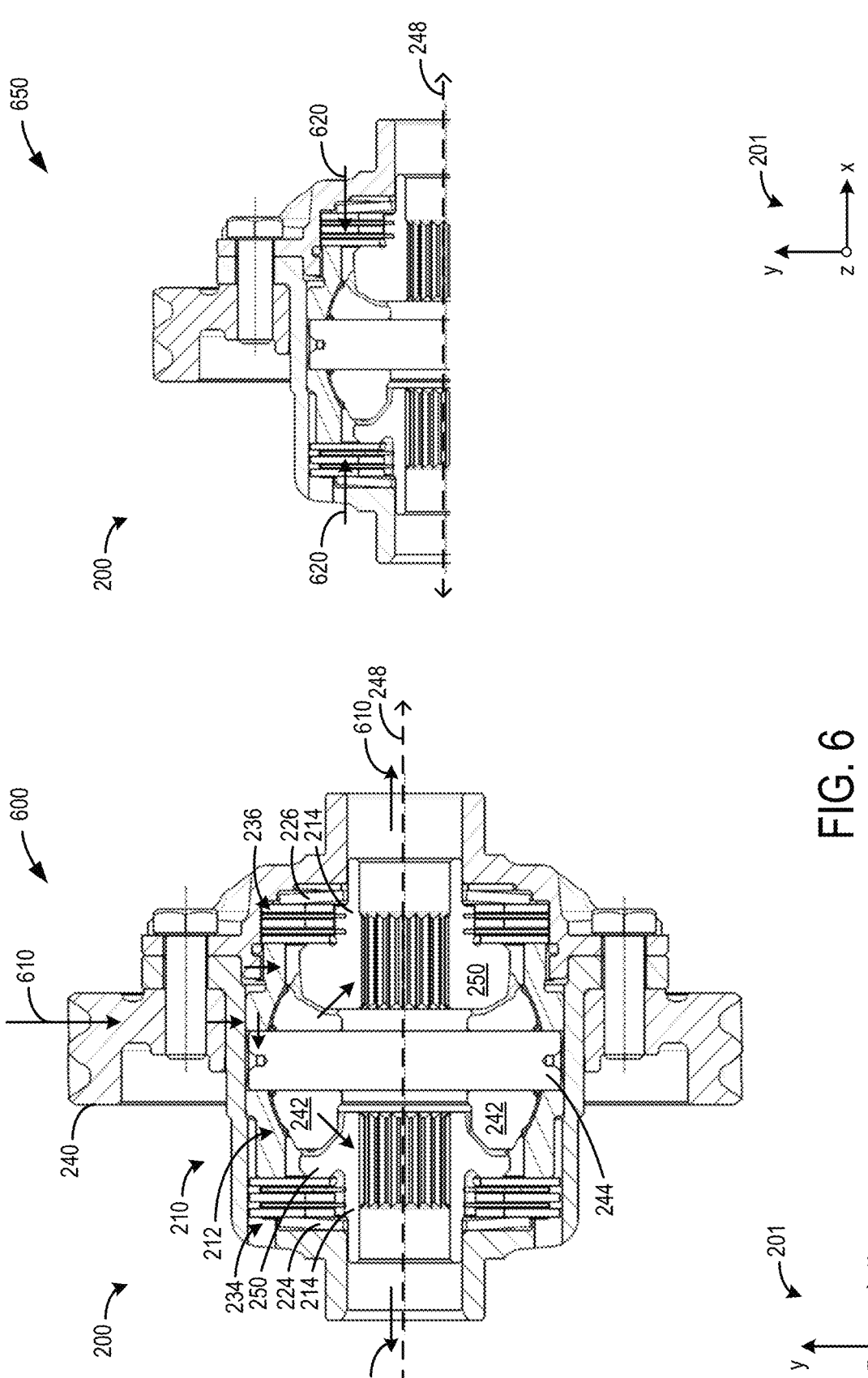
FIG. 6 shows a schematic of the limited slip differential illustrating power flow through the limited slip differential.
Figure 7:
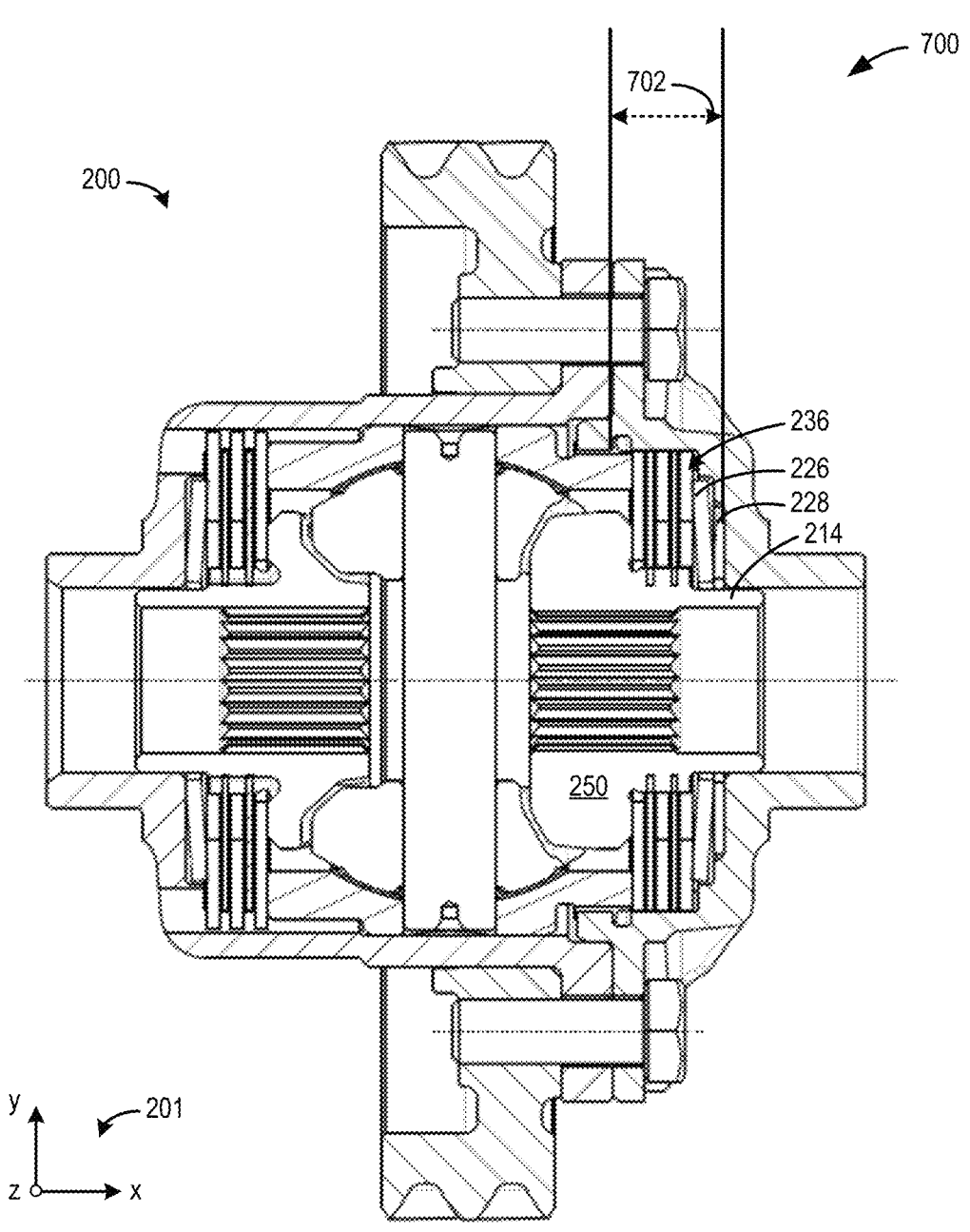
FIG. 7 shows a cross-sectioned side view of the limited slip differential, illustrating a shim dimension between a clutch pack and a two-piece differential case of the limited slip differential.
Figure 8:
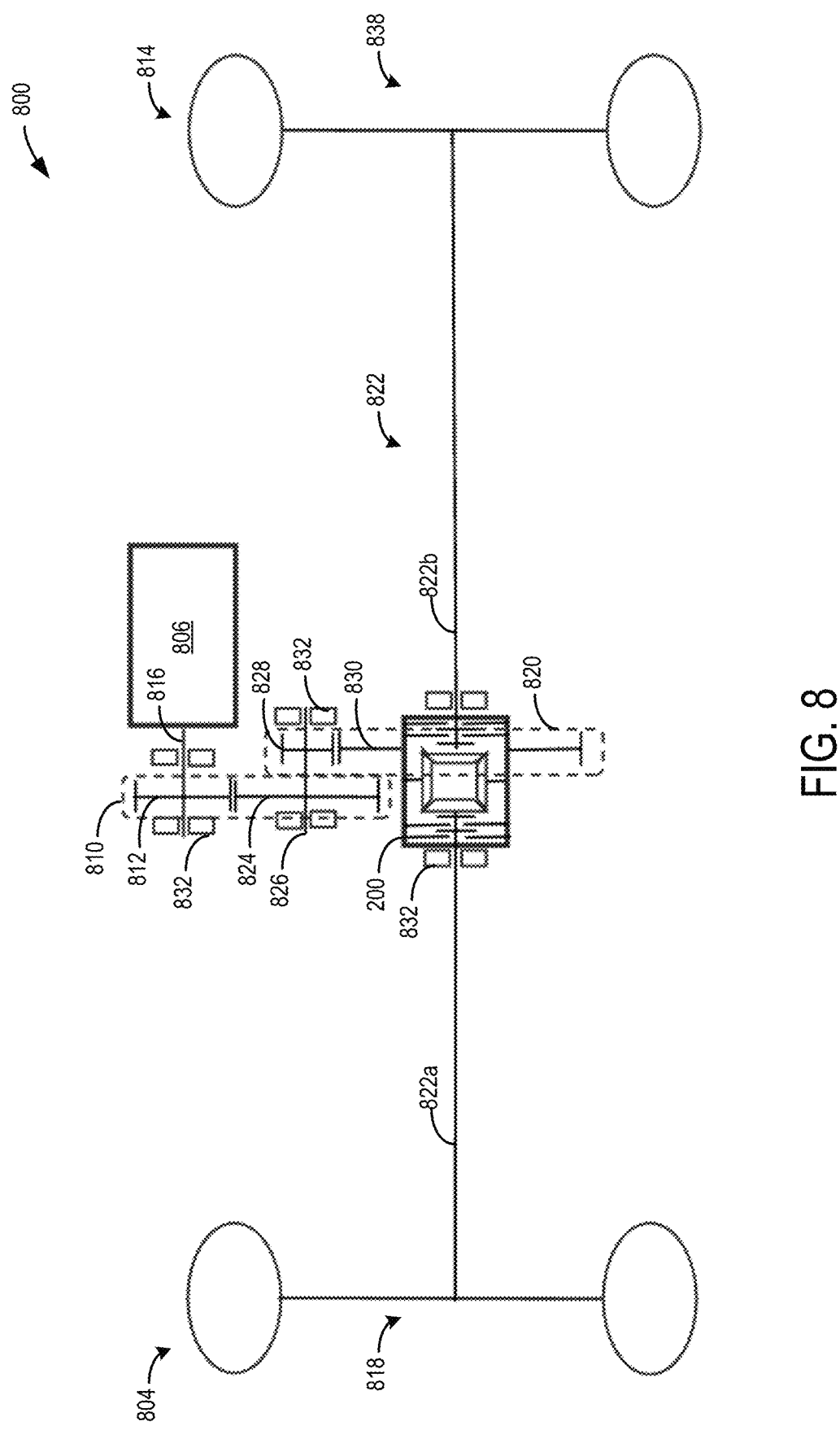
FIG. 8 shows a first example driveline of the vehicle of FIG. 1.
Figure 9:
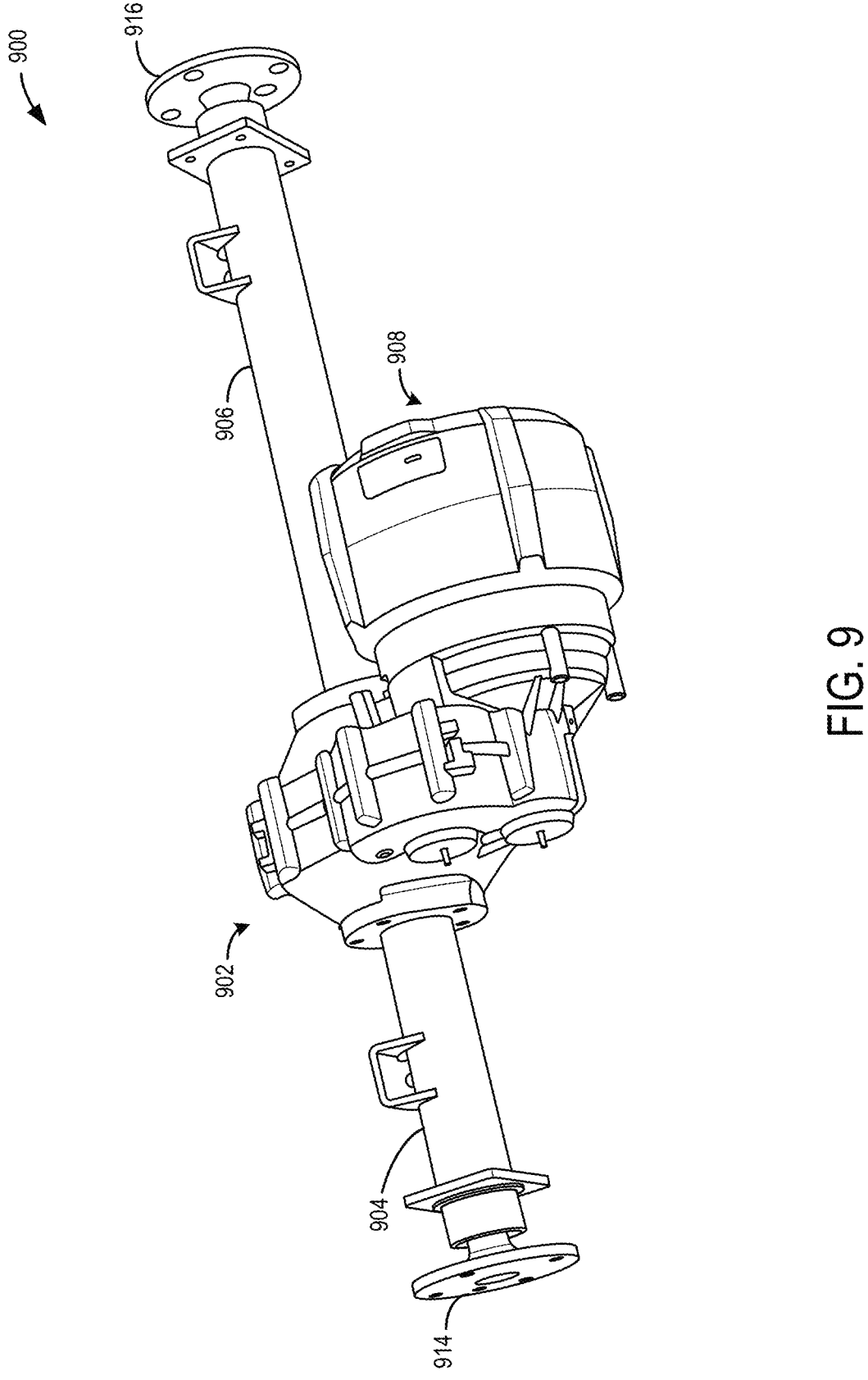
FIG. 9 shows a second example driveline of the vehicle of FIG. 1.
Figure 10:
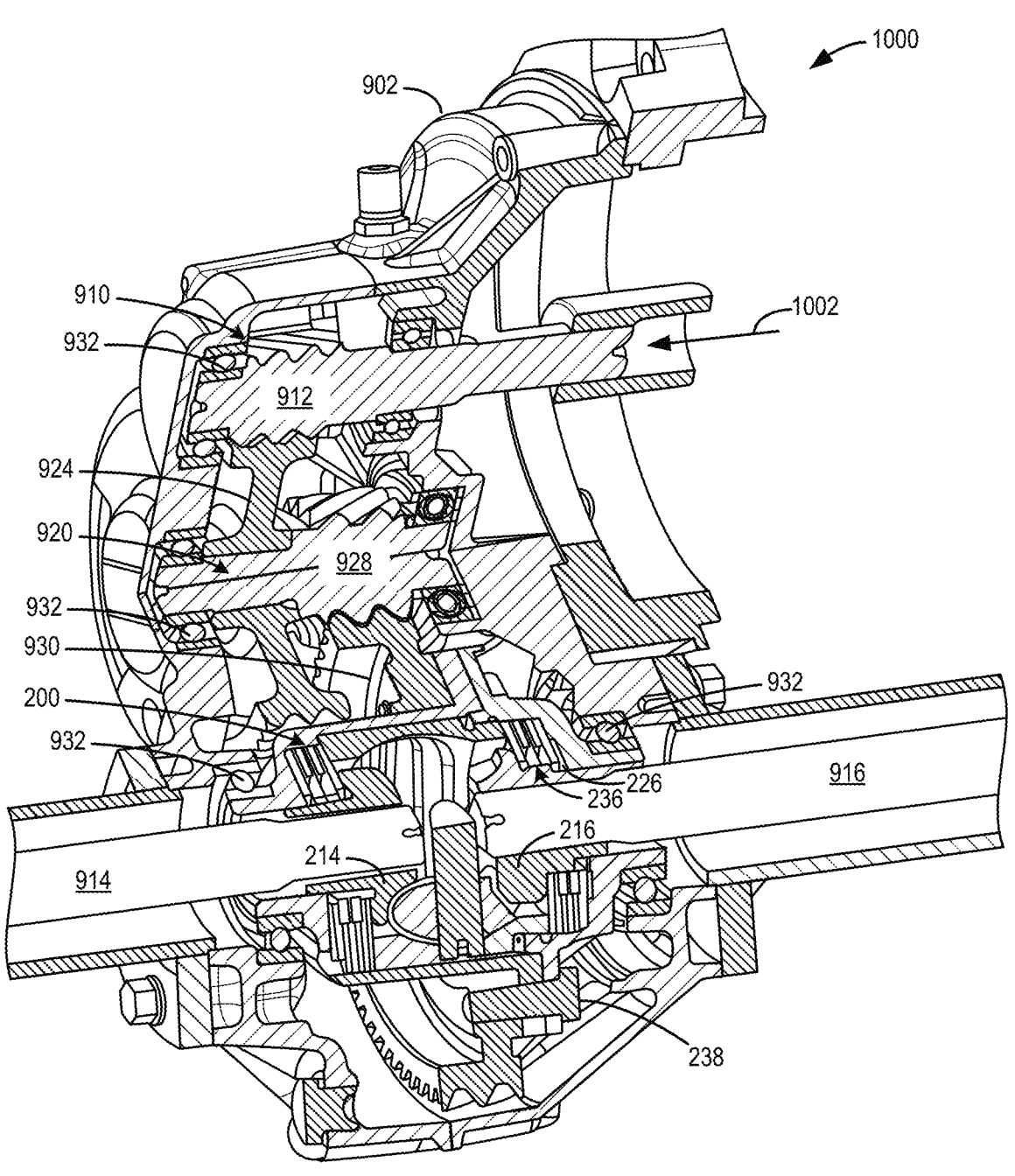
FIG. 10 shows a sectioned view of the second example driveline of FIG. 9.

FIG. 1 shows an example schematic of a drivetrain and a power train of a vehicle, where a LSD may be included as part of the transmission. FIG. 2 shows an example embodiment of the LSD in a side view and a cross-sectional view. A floating intermediate piece of the LSD enables control of torque distribution between drive wheels of the vehicle in response to resistance experienced by each of the drive wheels. FIG. 3 shows an exploded view of the LSD of FIG. 2, and FIGS. 4 and 5 show perspective cross-sectioned exploded views of the LSD. FIG. 6 shows a schematic illustrating power flow through the LSD. Preloading of clutch packs of the LSD using a shim is illustrated in the schematic of FIG. 7. FIG. 8 shows the LSD integrated in a first example driveline of the vehicle of FIG. 1. FIG. 9 shows the LSD integrated in a second example driveline of the vehicle of FIG. 1. FIG. 10 shows a sectioned view of the second example driveline of FIG. 9, including a first reduction and a second reduction coupling a power source of the vehicle to the LSD. FIGS. 2-7 and 9-10 are shown approximately to scale; though other relative dimensions may be used.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. As used herein, the terms "approximately" is construed to mean plus or minus five percent of the range unless otherwise specified.

Further, FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified. Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The vehicle 100 may be a commercial vehicle, light, medium, or heavy duty vehicle, a passenger vehicle, an off-highway vehicle, an off-road vehicle, and/or a sport utility vehicle. Additionally or alternatively, the vehicle 100 and/or one or more of its components may be in industrial, locomotive, military, agricultural, and aerospace applications. The vehicle 100 may have a longitudinal axis 130. The powertrain 101 and drivetrain 103 may have a length parallel with the longitudinal axis 130. The vehicle 100 may also have a front side 132 and a rear side 134.

The powertrain 101 comprises a power source 106 and a transmission 108. The power source 106 may be an internal combustion engine (ICE) or an electric motor, for example, and is operated to provide rotary power to the transmission 108. In one example, the vehicle 100 is an all-electric vehicle or a vehicle with all-electric modes of operation, such as a plug-in hybrid vehicle. As such, the power source 106 is an electric machine, such as an electric motor/generator. The transmission 108 may be any type of transmission, such as a manual transmission, an automatic transmission, or a continuously variable transmission. The transmission 108 receives the rotary power produced by the power source 106 as an input and outputs rotary power to the drivetrain 103 in accordance with a selected gear or setting. Additionally, there may be other movers in the vehicle besides power source 106. In one example, the power source 106 is an ICE and there is at least a second mover with an input to the transmission 108, wherein the second mover may be an electric machine, such as an electric motor. In some examples, additionally or alternatively, the transmission 108 may be a first transmission, further comprising a second transmission arranged on a second set of axle shafts 128. Herein, the transmission 108 may be interchangeably referred to as a gearbox.

The power source 106 may be powered via energy from an energy storage device 105. In one example, the energy storage device 105 is a battery configured to store electrical energy and the power source 106 is an electric motor. An inverter 107 may be arranged between the energy storage device 105 and the power source 106 and configured to adjust direct current (DC) to alternating current (AC). The inverter 107 may include a variety of components and circuitry with thermal demands that effect an efficiency of the inverter.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near the front side 132 of the vehicle 100 and thereby comprises a front axle, and the second axle assembly 112 is arranged near rear side 134 of the vehicle 100 and thereby comprises a rear axle. The second axle assembly 112 may be closer to the rear side 134 compared to the front side 132. In the embodiment shown in FIG. 1, the drivetrain 103 is a front wheel drivetrain with front-wheel drive (FWD) capabilities. Rotational energy generated by movers of the vehicle 100, such as the power source 106, may be delivered to the first axle assembly 102 at the front of the vehicle 100. The drivetrain 103 is shown in a four-wheel drive configuration, although other configurations are possible. For example, the drivetrain 103 may include a rear-wheel drive (RWD) or an all-wheel drive configuration (AWD). Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential unit 116 of the first axle assembly 102 to drive the first set of wheels 104, while the second driveshaft 122 (e.g., a rear driveshaft) transmits the rotary power from the transfer case 110 to a second differential unit 126 of the second axle assembly 112 to drive the second set of wheels 114. For example, the first differential unit 116 is drivingly coupled to a first axle half shaft and a second axle half shaft, e.g., as a first set of axle shafts 118, to the first set of wheels 104. The second differential unit 126 is drivingly coupled a first axle half shaft and a second axle half shaft, e.g., second set of axle shafts 128, coupled to the second set of wheels 114. The first set of axle shafts 118 and the second set of axle shafts 128 may each be rotating on a rotational axis. For example, the rotational axis of the first axle assembly 102 may be a first rotational axis 127 and the rotational axis of the second axle assembly 112 may be a second rotational axis 129.

It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130. The second differential unit 126 may be part of a rear differential unit.

The vehicle 100 may include a parking brake 120 installed on the first driveshaft 113 between the first differential unit 116 and the power source 106, and/or on the second driveshaft 122 between the second differential unit 126 and the power source 106. The parking brake 120 may be selectively engaged to halt transmission of rotational power from the power source 106 to one or more of the first differential unit 116 and/or the second differential unit 126 via the first driveshaft 113 and/or the second driveshaft 122, respectively. The parking brake 120 may be engaged when the vehicle 100 is parked on a grade, for example.

The first differential unit 116 may supply a FWD in some capacity to vehicle 100 as part of rotary power transferred via the first driveshaft 113. Likewise, the second differential unit 126 may supply a RWD to vehicle 100, as part of the rotary power transferred via the second driveshaft 122. The first differential unit 116 and the second differential unit 126 may supply a FWD and RWD, respectively, as part of an AWD mode for vehicle 100. Each of the first differential unit 116 and the second differential unit 126 may distribute rotational power to the first axle half shaft and the second axle half shaft of the respective set of axle shafts in such a way that a same or a different amount of torque is provided to each axle half shaft, thus enabling different drive wheels (e.g., a first drive wheel 104a and a second drive wheel 104b of the first set of wheels 104) on the same axle (e.g., the first set of axle shafts 118) to rotate at different speeds, such as when the vehicle 100 is turning, is driving on a low-traction surface, and/or when drive wheels are driving on surfaces having different amounts of traction.

One or both of the first differential unit 116 and the second differential unit 126 may be a limited slip differential (LSD). A conventional LSD may not include sufficient space for differential gears due to a clutch pack of the LSD being preloaded to achieve a desired performance of the LSD. Disc springs used to preload the clutch pack are selected based on preload calculations. In particular, a spring size of the disc springs is selected based on spatial constraints and an ability of the disc springs to achieve a desired preload. Further, in the conventional LSD, a cavity in which the clutch pack is positioned is directly machined in a differential housing. Since a spatial constraint of the cavity is based on an outer diameter of the differential, machining the cavity based on a size of the clutch pack may demand spherical machining of satellite gears of the LSD. As described above, it is desirable to have a LSD with a relatively small footprint and weight that provides torque distribution from a power source among drive wheels experiencing different amounts of traction.

Described herein is a LSD that may be implemented as a differential of a vehicle, such as one or both of the first differential unit 116 and the second differential unit 126 of the vehicle 100. The LSD may distribute torque between drive wheels positioned on either end of an axle (e.g., the first drive wheel 104a and the second drive wheel 104b) in response to tractive resistance experienced by each drive wheel. Differences in tractive resistance may be caused by the drive wheels driving on surfaces having different traction, such as asphalt (e.g., high traction) and turf (e.g., low traction). In some embodiments, the LSD may be implemented on a drive shaft coupled to two sets of drive wheels and may distribute torque to each set of drive wheels in response to tractive resistance experienced by each set of drive wheels. In other embodiments, the LSD may be implemented on a pair of axle shafts, where each axle shaft rotatably drives a drive wheel. As further described herein, the LSD includes an intermediate floating piece positioned within a two-piece differential case. The intermediate floating piece is configured to move/slide axially within the two-piece differential case (e.g., parallel to an axis of rotation of the drive wheels). A disc spring on either side of the intermediate floating piece preloads each of two clutch packs mounted on side gears that are meshed with the intermediate floating piece. When a first drive wheel experiences tractive resistance (e.g., the first drive wheel is driving on a high traction surface), preload on a corresponding clutch pack may be overcome by a force of the tractive resistance, and the corresponding clutch pack may be engaged to provide more torque to the first drive wheel, compared to a second drive wheel experiencing less tractive resistance. For example, the second drive wheel may be driving on a low-traction surface (e.g., grass or turf) and preload on a corresponding clutch pack may not be overcome by a force of the tractive resistance (e.g., low tractive resistance from a low-traction surface). The corresponding clutch pack may not be further engaged, and less torque is directed from the power source to the second drive wheel. In this way, torque may be efficiently distributed among drive wheels in such a way that distribution of torque enables the vehicle to drive simultaneously on low and high-traction surfaces. Additionally, preload applied by disc springs to respective clutch packs of the LSD as described herein may further prevent sliding, slipping, or rolling of drive wheels coupled to the LSD when a parking brake is engaged and the drive wheels are parked on a grade having different surface tractions under the drive wheels of the vehicle. As further described herein, configuration of the LSD provides a small footprint, low weight design that enables the LSD to be implemented in a variety of vehicle types (e.g., on road, off road, heavy duty, light duty, and so on).

FIG. 2 shows a side view 204 and a cross-sectioned side view 202 of a LSD 200. As described above, the LSD 200 may be an example of one or more of the first differential unit 116 and the second differential unit 126 of the vehicle 100 of FIG. 1. A set of reference axes 201 are provided for comparison between views shown in FIG. 2-7. The reference axes 201 indicate a y-axis, an x-axis, and a z-axis. In one example, the y-axis may be parallel with a direction of gravity and the x-z plane may be parallel with a horizontal plane. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view. The axes may have other orientations in other examples.

The LSD 200 comprises a two-piece differential case 210, an intermediate floating piece 212, a first side gear 214 and a second side gear 216, a first disc spring 224 and a second disc spring 226, a first clutch pack 234 and a second clutch pack 236, and a shim 228. The two-piece differential case 210 is formed of a first differential case half 222 and a second differential case half 232, which are selectively coupled to each other via bolts 238. The first differential case half 222 and the second differential case half 232 may be additionally or alternatively coupled using screws, clips, clamps, and/or any other coupling mechanism that enables the two-piece differential case 210 to rotate as a single piece and allows the first differential case half 222 and the second differential case half 232 to be separated, as further described herein. As further described herein with respect to FIGS. 3-10, the LSD 200 may include an output gear 240 that is mounted on the two-piece differential case 210. For example, the output gear 240 may be mounted on the first differential case half 222 in such a way that rotation of the output gear 240 rotates the two-piece differential case 210.

The intermediate floating piece 212 includes a sleeve assembly 220 with planet gears 242 and a pin 244 positioned therein. The intermediate floating piece 212 is positioned in an interior of and coupled to the two-piece differential case 210 via splines that enable the intermediate floating piece 212 to move axially. For example, the intermediate floating piece 212 may slide axially along an axis 248 (e.g., to the right or to the left) in response to a drive wheel mounted on an axle shaft coupled to a side gear (e.g., the first side gear 214 or the second side gear 216) on a respective side experiencing traction resistance that is greater than force applied by a respective disc spring (e.g., the first disc spring 224 or the second disc spring 226) on a respective clutch pack (e.g., the first clutch pack 234 or the second clutch pack 236), as further described with respect to FIGS. 6-10. Inclusion of the intermediate floating piece 212 in the LSD 200, rather than a stationary planetary gear set common in conventional limited slip differentials, enables inclusion of larger clutch packs (e.g., the first clutch pack 234 and the second clutch pack 236), compared to conventional LSDs. The intermediate floating piece 212 also assists in balancing preload created by the first disc spring 224 and the second disc spring 226 on the first clutch pack 234 and the second clutch pack 236, respectively, such that each of the first clutch pack 234 and the second clutch pack 236 have equal preload applied thereto. In the example of the LSD 200 shown in FIG. 2, the shim 228 is positioned on a right side of the LSD (e.g., between the second disc spring 226 and the two-piece differential case 210). The shim 228 controls an amount of preload applied to each of the first clutch pack 234 and the second clutch pack 236. For example, as further described with respect to FIG. 7, a width (e.g., parallel to the x-axis) of the shim 228 controls the amount of preload, where a shim having a greater width applies more preload to the clutch packs, a shim having a relatively smaller width applies less preload to the clutch packs. Described another way, the shim 228 controls an amount of preload applied to the clutch packs, and the intermediate floating piece 212 balances preload applied to each clutch pack. In conventional designs where an intermediate piece of the LSD is not floating (e.g., may not move/slide axially), a second shim may be included in the LSD to apply preload to a second clutch pack. For example, with reference to the LSD 200, a second shim may be positioned between the first disc spring 224 and the two-piece differential case 210 in addition to the shim 228 positioned between the second disc spring 226 and the two-piece differential case 210, and the intermediate floating piece 212 may not move/slide axially. In this arrangement, it may be challenging to achieve equal preload of both clutch packs. Thus, configuration of the LSD 200 as described herein is preferable, as it provides a non-complex arrangement of differential elements that enables equal preload of the clutch packs (e.g., via the intermediate floating piece 212 and the shim 228). The LSD 200 is additionally easy to service, as further described herein, as the two-piece differential case 210 may be opened to adjust the shim 228 without removing the intermediate floating piece 212 and/or the non-shimmed clutch pack (e.g., the first clutch pack 234).

The first side gear 214 and the second side gear 216 are each selectively meshed with the planet gears 242 of the intermediate floating piece 212. The first disc spring 224 is mounted on the first side gear 214, and the second disc spring 226 is mounted on the second side gear 216. The first clutch pack 234 is mounted on the first side gear 214 and positioned between the first disc spring 224 and a lip 250 of the first side gear 214. The second clutch pack 236 is mounted on the second side gear 216 and positioned between the second disc spring 226 and the lip 250 of the second side gear 216. The shim 228 is mounted on the second side gear 216 and positioned axially between the second disc spring 226 and the two-piece differential case 210. As described above, the shim 228 enables preload on both of the first clutch pack 234 and the second clutch pack 236 to be set to a desired level.

The first disc spring 224 is configured to preload the first clutch pack 234, and the second disc spring 226 is configured to preload the second clutch pack 236. For example, the first disc spring 224 applies force to and preloads the first clutch pack 234 against the lip 250 of the first side gear 214, and the second disc spring 226 applies force to and preloads the second clutch pack 236 against the lip 250 of the second side gear 216. Each of the first disc spring 224 and the second disc spring 226 may maintain a constant preload on a respective clutch pack throughout a life of the LSD 200. As shown in further detail in FIGS. 3-7, each of the first clutch pack 234 and the second clutch pack 236 comprise alternating friction plates and reaction plates. Reaction plates are mounted inside the two-piece differential carrier via a spline connection, and are configured to move/slide axially on the respective side gear between the respective disc spring and the lip of the side gear. Friction plates are mounted on the respective side gears. The intermediate floating piece 212 is configured to provide a reaction surface for each of the first clutch pack 234 and the second clutch pack 236. Each of the first clutch pack 234 and the second clutch pack 236 act as a connection between the two-piece differential case 210 and a respective side gear (e.g., the first side gear 214 and the second side gear 216, respectively). The intermediate floating piece 212 may have a spherical radius and may be formed of bronze. When formed of bronze, the intermediate floating piece 212 may enable the planet gears 242 to be mounted directly in the sleeve assembly 220, instead of using spherical washers between the sleeve assembly 220 and each planet gear 242, as bronze may be less prone to degradation due to friction from movement of the planet gears 242 with respect to the sleeve assembly 220. The intermediate floating piece 212 may be used as a common assembly for different clutch packs of the limited slip differential, and is used to realize different torque biases on the LSD 200. Preload on both of the first clutch pack 234 and the second clutch pack 236 may be adjusted by exchanging the shim 228, as further described herein.

The first differential case half 222 and the second differential case half 232 of the two-piece differential case 210 may be separated, for example by removing bolts 238 or other coupling mechanisms. When the first differential case half 222 and the second differential case half 232 are separated, maintenance may be performed on elements of the LSD 200. For example, the shim 228 may be removably mounted on the second side gear 216 and be removed and replaced by a shim with a larger or smaller thickness to adjust an amount of force applied by the second disc spring 226 on the second clutch pack 236. This may enable adjustment of a sensitivity of the LSD 200. Described another way, inclusion of a shim with a relatively greater thickness may increase an amount of force applied to both of the first clutch pack 234 and the second clutch pack 236.

The LSD 200 is configured to direct rotational speed and torque to both wheels coupled to the LSD 200 via axle shafts. The LSD 200 is configured to provide torque distribution among axle shafts coupled to side gears of the LSD 200 in response to tractive resistance experienced by drive wheels coupled to the axle shafts. Operation of the LSD 200 is described briefly here, and further described with respect to FIGS. 6-10. A first axle shaft may be coupled to the first side gear 214, and a second axle shaft may be coupled to the second side gear 216. For example, teeth of the first axle shaft may mesh with teeth 252 of the first side gear 214, and teeth of the second axle shaft may mesh with teeth 252 of the second side gear 216, such that each axle shaft is rotatably driven by a respective side gear. Preload is applied to each clutch pack by a respective disc spring, as described above. For example, the first clutch pack 234 is compressed a first amount between the first disc spring 224 and the lip 250 of the first side gear 214. The second clutch pack 236 may also be compressed the first amount between the second disc spring 226 and the lip 250 of the second side gear 216. The first disc spring 224 and the second disc spring 226 push the first side gear 214 and the second side gear 216, respectively, to mesh with the planet gears 242 of the intermediate floating piece 212. Thus, power is distributed from the power source to the first axle shaft and the second axle shaft via the LSD 200, where power may be equally distributed (e.g., when the first clutch pack 234 and the second clutch pack 236 are equally compressed). A first drive wheel coupled to the first axle shaft (e.g., driven by the first side gear 214) may experience a different tractive resistance than a second drive wheel coupled to the second axle shaft (e.g., driven by the second side gear 216) when the first drive wheel and the second drive wheel are driving on different surfaces. For example, the first drive wheel may drive on a low traction surface, such as grass or turf, and the second drive wheel may drive on a high traction surface, such as asphalt. To reduce free spinning of the first drive wheel and enable the vehicle to move from the low traction surface, it may be desirable to distribute different amounts of torque to each of the first drive wheel and the second drive wheel. An axle shaft of a drive wheel that is experiencing high tractive resistance (e.g., the second axle shaft driven by the second side gear 216) may provide a force in a direction opposite the preload on the respective clutch pack (e.g., the second clutch pack 236). In this scenario, the clutch pack is compressed from both sides: from axial gear force from the respective side gear, and from the respective disc spring force. For example, the second clutch pack 236 is compressed from a first side by force from the second axle shaft on the second side gear 216, and from a second, opposite side by force from the second disc spring 226. This two-sided compression increases torque transmitted by the clutch pack (e.g., the second clutch pack 236). When the force from tractive resistance is greater than the preload on the respective clutch pack, the respective clutch pack may be further compressed. Described another way, a magnitude of tractive resistance experienced by a drive wheel corresponds with a magnitude of force on the respective side gear. The intermediate floating piece 212 slides axially (e.g., along the axis 248) to balance force applied on both the first clutch pack 234 and the second clutch pack 236. Due to the force applied on each of the first clutch pack 234 and the second clutch pack 236, the two-piece differential case 210, the first side gear 214, and the second side gear 216 may rotate at the same speed and direct motion to the drive wheel opposite the free spinning wheel (e.g., direct motion to the drive wheel having more tractive resistance). Thus, more torque may be directed to the respective axle shaft than is directed to the axle shaft of the drive wheel experiencing less tractive resistance (e.g., the first axle shaft), and a power bias is achieved in a controlled manner. This may increase an efficiency of the drive system by regulating the power loss (e.g., reducing an amount of power directed to a low-traction and/or free spinning drive wheel). Further detail regarding torque distribution by the LSD 200 is described with respect to FIGS. 6-10.

The LSD 200 as described herein further enables holding of a vehicle on a grade with a differential tractive force on the drive wheels coupled to the LSD 200. In scenarios where a parking brake is installed on an input shaft between the LSD 200 and the power source (e.g., the parking brake 120 of FIG. 1), the LSD 200 may prevent rotation of drive wheels coupled thereto when the parking brake is engaged. This may prevent slipping, sliding, or rolling of one or more of the drive wheels. For example, the power source may be an electric motor, and an electromagnetic brake may be installed at an input pinion. The vehicle may be parked on a grade and drive wheels coupled to the LSD 200 (e.g., via axle shafts meshed with the side gears) may be in contact with surfaces having different tractive resistances. For example, the first drive wheel may be in contact with a surface having low traction, such as water or turf, and the second drive wheel may be contact with a surface having high traction, such as a dry road. The input shaft may be locked by the parking brake (e.g., prevented from providing rotational power from the power source to the drive wheels). In vehicles having a conventional differential or a conventional LSD, the drive wheels may rotate in opposite directions (e.g., the first drive wheel may rotate clockwise and the second drive wheel may rotate counterclockwise), allowing the vehicle to slide/roll on the grade. In vehicles configured with the LSD 200 described herein, a preload applied to clutch packs of the LSD 200 via disc springs may prevent such motion (e.g., prevent sliding or rolling of drive wheels), thus holding the vehicle stationary.

FIGS. 3-5 show additional details of elements of the LSD 200. FIG. 3 shows an exploded perspective view 300 of the LSD 200, FIG. 4 shows a first cross-sectioned perspective view 400 of the LSD 200, and FIG. 5 shows a second cross-sectioned perspective view 500 of the LSD 200. FIGS. 3-5 include the same elements as the LSD 200, and are simultaneously described herein.

Each of the exploded perspective view 300, the first cross-sectioned perspective view 400, and the second cross-sectioned perspective view 500 includes detailed views of elements of the LSD 200, including the output gear 240, the first differential case half 222, the first disc spring 224, the first clutch pack 234, the first side gear 214, the intermediate floating piece 212, the second side gear 216, the second clutch pack 236, the shim 228, the second disc spring 226, the second differential case half 232, and bolts 238. As briefly described with respect to FIG. 2, the bolts 238 may couple the first differential case half 222, the second differential case half 232, and the output gear 240. For example, the bolts 238 may be inserted into through holes 332 of the first differential case half 222, the second differential case half 232, and the output gear 240, as shown in FIG. 2.

As shown in FIGS. 3-5, the sleeve assembly 220 includes teeth 334 that may mesh with teeth 336 of the second differential case half 232 such that, when teeth 334 of the sleeve assembly 220 and teeth 336 of the second differential case half 232 are engaged/meshed, the intermediate floating piece 212 rotates with rotation of the two-piece differential case 210. Additionally, each of the first side gear 214 and the second side gear 216 include internal teeth 338 that may mesh with teeth of an axle half-shaft to drive rotation of the respective axle half-shaft, as further described with respect to FIGS. 6, 7, and 10. As briefly described with respect to FIG. 2, reaction plates 312 include a spline connection 314 (e.g., a plate extension) on an outer diameter of the reaction plates 312 that extends into a region of the first differential case half 222 or the second differential case half 232 (e.g., respective of the clutch pack) to enable rotation of the reaction plates 312 by the two-piece differential case 210. The spline connection on an outer diameter may not be present in the friction plates 316 of the clutch packs, thus the friction plates 316 may not rotate with rotation of the two-piece differential case 210 when the friction plates 316 are not engaged with (e.g., not in face-sharing contact with) the reaction plates 312. Alternatively, the friction plates 316 may include splines on an inner diameter that engage with external splines (e.g., teeth) of the respective side gears, enabling the friction plates 316 to rotate with rotation of the side gears.

FIG. 6 shows a power flow path illustrated by a series of arrows 610 in a cross-sectioned side view 600, and preloading of the first clutch pack 234 and the second clutch pack 236, illustrated by arrows 620, in a detailed view 650 of the LSD 200. As briefly described with respect to FIG. 2, power from a power source is distributed through a gear train and to the LSD 200 via the output gear 240. The power flow path then continues to the two-piece differential case 210 and the intermediate floating piece 212. Rotation of the output gear 240 rotates the two-piece differential case 210 about the axis 248, and rotation of the two-piece differential case 210 drives revolution of the planet gears 242, via the pin 244, about an axis 248. Revolution of the planet gears 242 drives rotation of side gears (e.g., the first side gear 214 and the second side gear 216) meshed with the planet gears 242. Torque is transferred to respective axial shafts coupled to (e.g., meshed with) the respective side gears. The LSD 200 is configured to direct motion (e.g., rotational speed) to the drive wheel that is experiencing higher traction and is stationary, compared to a conventional LSD that may transfer motion to a free-spinning drive wheel.

When drive wheels (e.g., coupled to axle shafts of the driveline) experience resistance (e.g., traction), a respective side gear is loaded and exerts axial force in an outward direction, thus activating the respective clutch pack. The load on each side gear is dependent on a magnitude of the force on the respective side gear, such that the drive wheel experiencing less resistance (e.g., less traction) receives lesser torque/power compared to the drive wheel experiencing more resistance (e.g., not slipping). In this way, power bias is achieved in a controlled manner that enables system efficiency (e.g., reduced power loss, compared to conventional differential units).

Transferring torque to the side gears (e.g., that may be rotating with different speeds due to different tractive resistances) may provide a power bias and assist in balancing the speeds of the drive wheels. In a conventional differential unit, the power bias is symmetric, therefore resistance (e.g., traction) on the drive wheels does not affect the power bias. This may be a disadvantage of the conventional differential unit, especially in scenarios where one of the drive wheels loses traction (e.g., on a wet or otherwise slippery drive surface), and a delta speed is substantially higher (e.g., large difference between rotational speeds of the drive wheels). This may result in power loss at the drive wheel that has lost traction. This may further be undesirable in the case of a vehicle parked on a grade, and/or on off-road driving surfaces (e.g., turf, grass, and so on). As further described herein, the LSD 200 may provide desirable traction to vehicles positioned on a grade and/or an off-road driving surface. Additionally, in scenarios where a vehicle using the conventional differential unit is parked on a low traction surface and/or on a grade, where the low traction surface is turf or grass, free rotation of one or more drive wheels may result in degradation of the drive surface due to skidding of the drive wheel against the drive surface during turning of the vehicle. Alternatively, in vehicles using the LSD 200, components of the LSD 200 enable preloading of the side gears, which may prevent one or more drive wheels from freely rotating in scenarios of low traction drive surfaces and/or the vehicle being parked on a grade.

Turning to FIG. 7, a cross-sectioned side view 700 of the LSD 200 is shown, including a shim dimension 702. The disc springs (e.g., the first disc spring 224 and the second disc spring 226) each have a load to compression relationship: as a compression of a disc spring increases, an amount of force exerted by the disc spring on a respective clutch pack increases, thus increasing preload. Due to manufacturing tolerances of various elements of the LSD 200 (e.g., the two-piece differential case 210, the intermediate floating piece 212, the first clutch pack 234, and the second clutch pack 236), an amount of compression of each disc spring may be variable, which may lead to a broad spread in performance of the clutch packs (e.g., ability of the clutch packs to enable or halt transmission of rotational power to a respective axle shaft). To address this variability, the shim 228 is introduced in the LSD 200, where the shim 228 may have a range of widths, parallel to the x-axis, that are selectable. For example, the shim 228 may be a first shim having a first width or a second shim having a second width, greater than the first width, and the second shim may replace the first shim as the shim 228. A shim, and thus a shim width, may be selected as the shim 228 according to variance of elements of the LSD 200 (e.g., an amount of compression achievable by one or more disc springs). The shim width may be selected to achieve and/or maintain the shim dimension 702 within a desired range of spring force, thus reducing degradation and increasing a useable life of the clutch packs and the LSD 200.

FIG. 8 shows a first example schematic of a driveline 800 that includes the LSD 200. The driveline 800 may be an example of the powertrain 101 and the drivetrain 103 of the vehicle 100 of FIG. 1. In the embodiment shown in FIG. 8, the LSD 200 is positioned on a driveshaft 822 (e.g., the second driveshaft 122), and thus controls torque distribution between a first set of drive wheels 804 positioned on a first pair of axle shafts 818, and a second set of wheels 814 positioned on a second pair of axle shafts 838. The LSD 200 is further configured to prevent sliding, slipping, or rolling of drive wheels coupled to the LSD 200 when a parking brake is engaged and the drive wheels are parked on a grade having different surface tractions under the drive wheels of the vehicle. The driveline 800 further includes a power source 806, which may be an electric motor or an ICE. The power source 806 provides rotational power to the first set of drive wheels 804 and the second set of drive wheels 814 via a first reduction 810, a second reduction 820, and the LSD 200 arranged in series, as further described herein. In the embodiment of FIG. 8, the driveshaft 822 may comprise two independent drive shaft halves (e.g., a first drive shaft half 822*a* and a second drive shaft half 822*b*). The LSD 200 may control an amount of torque delivered from the power source 806, via the first reduction 810 and the second reduction 820, to each of the first drive shaft half 822*a* and the second drive shaft half 822*b*, and therefore to the first set of drive wheels 804 and the second set of drive wheels 814.

The power source 806 has a power source output shaft 816 that provides rotational power from the power source 806 to gears of the first reduction 810. The first reduction 810 comprises an input pinion 812 configured to receive rotational power from the power source output shaft 816, and a first intermediate gear 824 meshed with the input pinion 812. The input pinion 812 may be coupled to, meshed with, and/or mounted on the power source output shaft 816, for example. The first intermediate gear 824 may be mounted on an intermediate shaft 826 in some embodiments. The second reduction 820 comprises a second intermediate gear 828 coupled to the first intermediate gear 824, and an output gear 830. The second intermediate gear 828 may be meshed with the first intermediate gear 824 or may be mounted on the intermediate shaft 826. The output gear 240 is meshed with the second intermediate gear 828 to transfer rotational power from the power source 806 to the LSD 200. Ball bearings 832 (e.g., shown as pairs of rectangles on either side of the respective shaft) on each of the input pinion 812, the intermediate shaft 826, and the driveshaft 822 may enable rotation of the respective element/gear.

The LSD 200 is configured to distribute torque from the power source 806 between the first set of drive wheels 804 and the second set of drive wheels 814 via the first pair of axle shafts 818 and the second pair of axle shafts 838, respectively, where a different amount of torque may be distributed to each pair of axle shafts in response to tractive resistance experienced by each of the first set of drive wheels 804 and the second set of drive wheels 814. For example, one or more of the drive wheels of the first set of drive wheels 804 may be positioned on and/or may drive on a low traction surface, such as turf, grass, water, and so on, and one or more of the drive wheels of the second set of drive wheels 814 may simultaneously be positioned on and/or may drive on a relatively high traction surface, such as a dry road. The drive wheel(s) on the low traction surface experience less traction resistance compared to the drive wheel(s) on the high traction surface. As described above with respect to FIGS. 2 and 6-7, force applied by the first disc spring 224 and the second disc spring 226 on the first clutch pack 234 and the second clutch pack 236, respectively, may be less than tractive resistance experienced by the drive wheel(s) on the high traction surface.

The LSD 200 described herein may further be used to distribute torque from the power source among drive wheels of a same drive axle shaft pair, as further described with respect to FIGS. 9-10. Turning to FIG. 9, a perspective view of a second example of a driveline 900 including the LSD 200 is shown. The driveline 900 may be an example of the powertrain 101 and the drivetrain 103 of the vehicle 100 of FIG. 1. In the embodiment shown in FIG. 9, a drive gear box housing 902 is mounted on a first trumpet arm 904 and a second trumpet arm 906. The drive gear box housing 902 houses the LSD 200 and other gear elements, as further described with respect to FIG. 10. For example, the drive gear box housing 902 of the driveline 900 includes elements described with respect to the driveline 800 of FIG. 8. A power source 908, such as an electric motor, is coupled to the LSD 200 as described with respect to FIGS. 2-8, and a housing of the power source 908 may be coupled to the second trumpet arm 906 in some embodiments. A first axle shaft 914 and a second axle shaft 916 extend through the first trumpet arm 904 and the second trumpet arm 906, respectively, and are rotatably driven by the power source 908 via the LSD 200 and other elements housed in the drive gear box housing 902. The LSD 200 thus controls torque distribution between the first axle shaft 914 and the second axle shaft 916. As described with respect to FIG. 1, the first axle shaft 914 and the second axle shaft 916 are coupled to a first drive wheel and a second drive wheel, respectively (not shown) to provide rotational power to the drive wheels from the power source 908. The first axle shaft 914 and the second axle shaft 916 are rotatably independent, therefore different torque amounts from the power source 908 may be provided to each of the first drive wheel and the second drive wheel via the LSD 200, as further described with respect to FIG. 10.

FIG. 10 shows a cutaway view 1000 of the driveline 900 of FIG. 9, which provides an internal view of elements of the drive gear box housing 902, including the LSD 200, and the first axle shaft 914 and the second axle shaft 916. As described with respect to FIG. 9, the driveline 900 includes the power source 908, not shown in FIG. 10. Rotational power from the power source 908 is provided to gears housed in the drive gear box housing 902, as shown by a first arrow 1002. The drive gear box housing 902 houses the first reduction 910 and the second reduction 920, which are configured as described with respect to the first reduction 810 and the second reduction 820 of FIG. 8, and thus similarly numbered. Rotational power from the power source 908 is transmitted through the first reduction 910 and the second reduction 920 to the LSD 200. In the example shown in FIG. 10, the input pinion 912 of the first reduction 910 receives rotational power from the power source 908, and the first intermediate gear 924 is meshed with the input pinion 912. The input pinion 912 may be coupled to, meshed with, and/or mounted on a power source output shaft, for example. The first intermediate gear 924 may be mounted on an intermediate shaft in some embodiments, or may be positioned between and meshed with the input pinion 912 and the second intermediate gear 928. In further embodiments, the second intermediate gear 928 may include a shaft on which the first intermediate gear 924 is mounted. The output gear 930 is meshed with the second intermediate gear 928 to provide reduced power from the power source 908 to the first axle shaft 914 and the second axle shaft 916 via the LSD 200.

The first axle shaft 914 is coupled to a first drive wheel, as described above, and is further coupled to the first side gear 214 of the LSD 200, opposite the first drive wheel. The second axle shaft 916 is coupled to the second drive wheel, and is further coupled to the second side gear 216 of the LSD 200, opposite the second side wheel. Elements of the driveline 900 described herein may be mounted within the drive gear box housing 902 using ball bearings 932. For example, ball bearings 932 on each of the input pinion 912, the first intermediate gear 924, and the two-piece differential case 210 enable rotation of the respective element, independent of the drive gear box housing 902.

In the example of the driveline 900, the LSD 200 is configured to distribute torque from the power source 908 between the first drive wheel and the second drive wheel via the first axle shaft 914 and the second axle shaft 916, respectively, where a different amount of torque may be distributed to each axle shaft in response to tractive resistance experienced by each of the first drive wheel and the second drive wheel. For example, the first drive wheel may be positioned on and/or may drive on a low traction surface, such as turf, grass, water, and so on, and the second drive wheel may simultaneously be positioned on and/or may drive on a relatively high traction surface, such as a dry road. The first drive wheel on the low traction surface experience less traction resistance compared to the second drive wheel on the high traction surface. Force applied by the second disc spring 226 on the second clutch pack 236 may be less than traction resistance experienced by the second drive wheel on the high traction surface.

In this way, torque distribution may be provided by the LSD among drive wheels of a vehicle that may be experiencing different amounts of tractive resistance from driving surfaces having different amounts of traction. Additionally, the LSD may provide resistance to sliding, slipping, or rolling of drive wheels coupled to the LSD when a parking brake is engaged and the drive wheels are parked on a grade having different surface tractions under the drive wheels of the vehicle. Compared to conventional differentials and conventional LSDs, the LSD described herein may have a smaller footprint, a lesser weight, and be less complex. Additionally, the LSD may be more efficient (e.g., less power loss) due to the intermediate floating piece being configured to slide axially and selectively engage with side gears of the LSD. Further, an amount of preload provided by one or more disc springs to the respective clutch pack is configurable by exchanging shims having various thicknesses, which may be easily performed due to the two-piece differential case formed of selectively coupled differential case halves.

The technical effect of the disclosed systems is a durable and compact layout design using a smaller footprint and less complex configuration.

The disclosure also provides support for a limited slip differential, comprising: a two-piece differential case, an intermediate floating piece positioned in an interior of and coupled to the two-piece differential case via splines that enable the intermediate floating piece to slide axially, the intermediate floating piece including a sleeve assembly with planet gears and a pin positioned therein, a first side gear and a second side gear meshed with each of the planet gears, a first disc spring mounted on the first side gear and a second disc spring mounted on the second side gear, a first clutch pack mounted on the first side gear and positioned between the first disc spring and a lip of the first side gear, and a second clutch pack mounted on the second side gear and positioned between the second disc spring and a lip of the second side gear, and a shim mounted on the second side gear and positioned axially between the second disc spring and the two-piece differential case. In a first example of the system, the first disc spring is configured to preload the first clutch pack, and the second disc spring is configured to preload the second clutch pack. In a second example of the system, optionally including the first example, the two-piece differential case is formed of a first differential case half and a second differential case half that is selectively coupled to the first differential case half. In a third example of the system, optionally including one or both of the first and second examples, the system further comprises: an output gear mounted on the first differential case half. In a fourth example of the system, optionally including one or more or each of the first through third examples, the intermediate floating piece is configured to provide a reaction surface for each of the first clutch pack and the second clutch pack. In a fifth example of the system, optionally including one or more or each of the first through fourth examples, each of the first clutch pack and the second clutch pack comprise alternating friction plates and reaction plates. In a sixth example of the system, optionally including one or more or each of the first through fifth examples, the intermediate floating piece has a spherical radius. In a seventh example of the system, optionally including one or more or each of the first through sixth examples, the intermediate floating piece is formed of bronze.

The disclosure also provides support for a driveline, comprising: a power source having a power source output shaft, a first reduction comprising an input pinion coupled to and driven by the power source output shaft and a first intermediate gear mounted on an intermediate shaft and meshed with the input pinion, a second reduction comprising a second intermediate gear driven by the first intermediate gear and an output gear driven by the second intermediate gear, and a limited slip differential coupled to the output gear, the limited slip differential comprising a two-piece differential case, an intermediate floating piece positioned in an interior of and coupled to the two-piece differential case via splines that enable the intermediate floating piece to slide axially, the intermediate floating piece including a sleeve assembly with planet gears and a pin positioned therein, a first side gear and a second side gear meshed with each of the planet gears, a first disc spring mounted on the first side gear and a second disc spring mounted on the second side gear, a first clutch pack mounted on the first side gear and positioned between the first disc spring and a lip of the first side gear, and a second clutch pack mounted on the second side gear and positioned between the second disc spring and a lip of the second side gear, and a shim mounted on the second side gear and positioned axially between the second disc spring and the two-piece differential case. In a first example of the system, the system further comprises: a first axle shaft coupled to a first drive wheel and to the first side gear of the limited slip differential, and a second axle shaft coupled to a second drive wheel and to the second side gear of the limited slip differential. In a second example of the system, optionally including the first example, the system further comprises: ball bearings on each of the input pinion, the first intermediate gear, the second intermediate gear, and the two-piece differential case that enable rotation of the respective element, independent of a drive gear box housing. In a third example of the system, optionally including one or both of the first and second examples, the intermediate floating piece is configured to move axially in line with the first axle shaft and the second axle shaft. In a fourth example of the system, optionally including one or more or each of the first through third examples, the power source is an electric machine. In a fifth example of the system, optionally including one or more or each of the first through fourth examples, the power source is an internal combustion engine.

The disclosure also provides support for a driveline, comprising: a first axle shaft coupled to a first drive wheel, a second axle shaft coupled to a second drive wheel, a power source configured to distribute torque to the first drive wheel and the second drive wheel via the first axle shaft and the second axle shaft, respectively, and a limited slip differential configured to control distribution of torque between the first drive wheel and the second drive wheel in response to resistance experienced by each of the first drive wheel and the second drive wheel, the limited slip differential comprising a differential case with an intermediate floating piece positioned in an interior of the differential case and configured to slide axially within the interior of the differential case, a first clutch pack and a first disc spring mounted on a first side gear that is meshed with the intermediate floating piece and coupled to the first axle shaft, and a second clutch pack and a second disc spring mounted on a second side gear that is meshed with the intermediate floating piece and coupled to the second axle shaft. In a first example of the system, the intermediate floating piece comprises planet gears mounted on a pin, and wherein the first side gear and the second side gear are meshed with the planet gears. In a second example of the system, optionally including the first example, the intermediate floating piece is coupled to the differential case via splines that enable the intermediate floating piece to slide axially. In a third example of the system, optionally including one or both of the first and second examples, the system further comprises: a shim removably mounted on the second side gear and positioned axially between the second disc spring and the differential case, the shim configured to provide a preload to the second axle shaft. In a fourth example of the system, optionally including one or more or each of the first through third examples, each of the first side gear and the second side gear are configured to exert axial force in an outward direction and activate a respective clutch pack of the first clutch pack and the second clutch pack in response to a respective wheel of the first drive wheel and the second drive wheel experiencing resistance that is greater than preload applied to the respective clutch pack of the first clutch pack and the second clutch pack by a respective disc spring of the first disc spring and the second disc spring. In a fifth example of the system, optionally including one or more or each of the first through fourth examples, the limited slip differential is configured to direct a lesser amount of torque from the power source to a drive wheel of the first drive wheel and the second drive wheel that is experiencing less resistance, compared to the drive wheel that is experiencing more resistance.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A limited slip differential, comprising:
a two-piece differential case including:
a first differential case piece with a gear coupled thereto; and
a second differential case piece removably coupled to the first differential case piece;
an intermediate floating piece positioned radially inward from the second piece and including a pin and planet gears rotatably coupled to the pin, wherein the intermediate floating piece is coupled to the differential case via splines that enable the intermediate floating piece to slide axially in relation to the differential case;
a first side gear and a second side gear meshed with each of the planet gears;
a first disc spring mounted on the first side gear and a second disc spring mounted on the second side gear;
a first clutch pack mounted on the first side gear and positioned between the first disc spring and a lip of the first side gear, and a second clutch pack mounted on the second side gear and positioned between the second disc spring and a lip of the second side gear; and
a shim mounted on the second side gear and positioned axially between the second disc spring and the two-piece differential case;
wherein each of the first side gear and the second side gear are configured to exert axial force in an outward direction and activate a respective clutch pack of the first clutch pack and the second clutch pack in response to a respective wheel of a first drive wheel and a second drive wheel experiencing resistance that is greater than a preload applied to the respective clutch pack of the first clutch pack and the second clutch pack by a respective disc spring of the first disc spring and the second disc spring.

2. The limited slip differential of claim 1, wherein the gear is mounted on the first differential case piece.

3. The limited slip differential of claim 1, wherein the intermediate floating piece is configured to provide a reaction surface for each of the first clutch pack and the second clutch pack.

4. The limited slip differential of claim 1, wherein each of the first clutch pack and the second clutch pack comprise alternating friction plates and reaction plates.

5. The limited slip differential of claim 1, wherein the intermediate floating piece has a spherical radius.

6. The limited slip differential of claim 1, wherein the intermediate floating piece is formed of bronze.

7. A driveline, comprising:
a power source having a power source output shaft;
a first reduction comprising an input pinion coupled to and driven by the power source output shaft and a first intermediate gear mounted on an intermediate shaft and meshed with the input pinion;
a second reduction comprising a second intermediate gear driven by the first intermediate gear and an output gear driven by the second intermediate gear; and
a limited slip differential coupled to the output gear, the limited slip differential comprising:
a two-piece differential case including:
a first differential case piece with the output gear coupled thereto; and
a second differential case piece removably coupled to the first differential case piece;
an intermediate floating piece positioned radially inward from the second piece and including a pin and planet gears rotatably coupled to the pin, wherein the intermediate floating piece is coupled to the differential case via splines that enable the intermediate floating piece to slide axially in relation to the differential case;
a first side gear and a second side gear meshed with each of the planet gears;
a first disc spring mounted on the first side gear and a second disc spring mounted on the second side gear;

a first clutch pack mounted on the first side gear and positioned between the first disc spring and a lip of the first side gear;

a second clutch pack mounted on the second side gear and positioned between the second disc spring and a lip of the second side gear; and a shim mounted on the second side gear and positioned axially between the second disc spring and the two-piece differential case;

wherein each of the first side gear and the second side gear are configured to exert axial force in an outward direction and activate a respective clutch pack of the first clutch pack and the second clutch pack in response to a respective wheel of a first drive wheel and a second drive wheel experiencing resistance that is greater than a preload applied to the respective clutch pack of the first clutch pack and the second clutch pack by a respective disc spring of the first disc spring and the second disc spring.

8. The driveline of claim 7, further comprising a first axle shaft coupled to the first drive wheel and to the first side gear of the limited slip differential, and a second axle shaft coupled to the second drive wheel and to the second side gear of the limited slip differential.

9. The driveline of claim 8, further comprising ball bearings on each of the input pinion, the first intermediate gear, the second intermediate gear, and the two-piece differential case that enable rotation independent of a drive gear box housing.

10. The driveline of claim 8, wherein the intermediate floating piece is configured to move axially in line with the first axle shaft and the second axle shaft.

11. The driveline of claim 7, wherein the power source is an electric machine.

12. The driveline of claim 7, wherein the power source is an internal combustion engine.

13. A driveline, comprising:

a first axle shaft coupled to a first drive wheel;

a second axle shaft coupled to a second drive wheel;

a power source configured to distribute torque to the first drive wheel and the second drive wheel via the first axle shaft and the second axle shaft, respectively; and a limited slip differential configured to control distribution of torque between the first drive wheel and the second drive wheel in response to resistance experienced by each of the first drive wheel and the second drive wheel, the limited slip differential comprising:

a differential case including:

a first differential case piece with a gear coupled thereto; and a second differential case piece removably coupled to the first differential case piece;

an intermediate floating piece positioned radially inward from the second piece and including a pin and planet gears rotatably coupled to the pin, wherein the intermediate floating piece is coupled to the differential case via splines that enable the intermediate floating piece to slide axially in relation to the differential case;

a first clutch pack and a first disc spring mounted on a first side gear that is meshed with the intermediate floating piece and coupled to the first axle shaft; and a second clutch pack and a second disc spring mounted on a second side gear that is meshed with the intermediate floating piece and coupled to the second axle shaft;

wherein each of the first side gear and the second side gear are configured to exert axial force in an outward direction and activate a respective clutch pack of the first clutch pack and the second clutch pack in response to a respective wheel of the first drive wheel and the second drive wheel experiencing resistance that is greater than a preload applied to the respective clutch pack of the first clutch pack and the second clutch pack by a respective disc spring of the first disc spring and the second disc spring.

14. The driveline of claim 13, wherein the intermediate floating piece comprises the planet gears mounted on the pin, and wherein the first side gear and the second side gear are meshed with the planet gears.

15. The driveline of claim 13, wherein the splines in the intermediate floating piece are position axially inboard from the second clutch pack.

16. The driveline of claim 13, further comprising a shim removably mounted on the second side gear and positioned axially between the second disc spring and the differential case, the shim configured to provide a preload to the second axle shaft.

17. The driveline of claim 13, wherein the limited slip differential is configured to direct a lesser amount of torque from the power source to a drive wheel of the first drive wheel and the second drive wheel that is experiencing less resistance, compared to the drive wheel that is experiencing more resistance.

* * * * *